United States Patent Office 2,881,198
Patented Apr. 7, 1959

2,881,198

PREPARATION OF ALKYL ORTHOSILICATES BY REACTING SILICON DIOXIDE WITH AN ALCOHOL

Donald L. Bailey, Snyder, and Francis M. O'Connor, Kenmore, N.Y., assignors to Union Carbide Corporation, a corporation of New York No Drawing. Application May 17, 1955
Serial No. 509,121

8 Claims. (Cl. 260—448.8)

This invention relates to a method of preparing alkyl orthosilicates by reacting silica and aliphatic alcohols under alkaline conditions.

It has been known for some time that aliphatic orthosilicates are readily hydrolyzed by water to yield silica and alcohol following the reaction:

$$(RO)_4Si + 2H_2O \rightarrow SiO_2 + 4ROH$$

It has been found now that such reaction is reversible under alkaline conditions, and that aliphatic orthosilicates may thus be prepared in high yields.

In the practice of the invention hydroxides of sodium, potassium and cesium have been found most useful as catalysts. Equally operative, however, are other alkali metal hydroxides, alkoxides, silanolates and derivatives thereof which form alkoxides in the presence of alcohol.

Silica from any source can be used in the practice of this invention. Finely divided silica, however, is preferable in order to decrease reaction time and increase yield. Silica obtained by treating sodium or potassium silicate with sulphuric acid followed by dehydration in the presence of the alcohol has been found to be the most preferable.

In the practice of the invention an amount of silica is treated with an excess of the stoichiometric amount of the alcohol whose orthosilicate is desired, in the presence of an alkali. Catalyst concentration expressed percentage-wise in terms of the ratio of alkali catalyst to total moles of catalyst and silica may be from 1 to 40 mole percent, the preferred range being 5 to 25 mole percent. Lower concentrations are to be avoided, since the reaction would then be too slow. At higher concentrations of catalyst, agglomeration of the silica occurs.

It is apparent from the reaction subject of the present invention:

$$SiO_2 + 4ROH \rightarrow (RO)_4Si + 2H_2O\uparrow$$

that water removal is necessary to obtain the desired products. In the practice of the invention this has been successfully accomplished by conducting the reaction in a reaction vessel connected to a fractionating column, which enables the water-containing reaction vapors to be removed from the overhead fraction. For best results a hydrocarbon solvent such as toluene, cyclohexane, xylene or benzene is added to the reactants to form an azeotropic mixture with the water formed during reaction. In this manner a water-rich vapor phase from the above azeotropic mixture passes through the fractionating column from which it may be easily removed, for example, by condensing the same phase in a moisture trap in the case of reactions involving alcohols having boiling points above that of water. The essentially water-free alcohol solvent mixture may be then recycled to the reaction vessel. In reactions involving alcohols which have a boiling point below that of water, water may also be removed by condensing the column overhead vapors, and then passing the condensate through an adsorbent which preferentially adsorbs water.

Methods of removing water from the reaction vessel, other than those described here, will readily suggest themselves to those skilled in the art.

The lower operable temperature limit for this process is about 100° C., while the upper operable temperature limit is probably the decomposition point of the alcohol whose orthosilicate is desired. Thus the particular temperature used in a given reaction will depend on the nature of the alcohol used as the reactant material. Ethyl orthosilicate, for example, is prepared by the instant reaction at temperatures above 100° C. and at autogenous pressures of about 50 to 400 pounds per square inch. Such pressures are necessary, as they enable the reaction vessel temperature to be increased to 100° C. or higher, and permit the carrying out of reaction at above the normal boiling point of the given alcohol.

The following examples illustrate the successful practice of the invention, but the equations shown therewith are not to be interpreted as representing all the possible reactions which may take place between the named reactants.

Example I

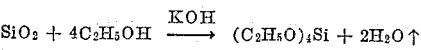

A dehydrated slurry containing 11 grams of $SiO_2$, 800 ml. of ethanol and 500 ml. of benzene was placed in a pressure kettle along with 3.25 grams of KOH. This vessel was connected to a metal fractionating column designed to operate at pressures up to 500 p.s.i.g., and packed with stainless steel helices. The system was pressurized under 400 p.s.i.g. nitrogen, and the reaction mixture stirred and heated at 195° C. to 200° C. for 16 hours. During this time the overhead vapors from the fractionating column were condensed and passed through a solenoid valve to a one inch diameter column packed with 1/16 inch diameter pellets of activated selective sieve material of the type disclosed in the November 20, 1954 issue of "Chemical Week," pages 64 to 68. The now dehydrated ethanol-benzene liquid mixture was reintroduced into the reaction vessel. At the end of the heating period, the reaction mixture was cooled, removed from the reaction vessel, filtered to remove unreacted silica, and then fractionated in a glass fractionating column. The lower boiling materials were removed at atmospheric pressure, and the ethyl orthosilicate was distilled under reduced pressure to obtain 29.5 grams of that product representing a 77.5 mole percent yield based on the silica charge.

Example II

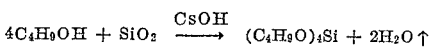

A mixture of 20 grams of finely divided silica, 250 grams of n-butyl alcohol, 5 grams of CsOH catalyst and 100 ml. of xylene was refluxed at atmospheric pressure in a fractionating system equipped with a moisture trap. After refluxing at a reaction vessel temperature of 118° C. to 119° C. for 119 hours, filtering the reaction mixture to remove unreacted silica, and then distilling under reduced pressure, 55.5 grams of butyl orthosilicate was obtained, representing a 52 mole percent yield, based on silica charge.

Example III

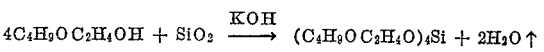

A mixture of 20 grams of finely divided silica, 300 grams of 2-butoxyethyl alcohol, 150 grams of xylene and 5 grams of KOH was placed in a reaction flask fitted in a fractionating column equipped with a moisture trap. This mixture was heated to a reaction vessel temperature of 150° C. to 160° C. for 104 hours. The reaction mixture next was cooled and filtered to remove silica. Upon distillation under reduced pressure, 84.5 grams of 2-butoxyethyl orthosilicate were obtained corresponding to a 51 mole percent yield based on the amount of silica employed.

In addition to the products obtained in the above examples, the instant process may be successfully applied to methyl, propyl and higher aliphatic alcohols. Such compounds are of industrial importance principally in their role as intermediates. Higher orthosilicates can be prepared simply by transesterification of ethyl orthosilicate with appropriate alcohols, an easy method of preparation of which is indicated in Example I above. A partially condensed product formed by adding water to an alcohol-ethyl orthosilicate solution finds extensive use in the "lost wax" precision casting method.

What is claimed is:

1. A method of preparing aliphatic orthosilicates, which method comprises refluxing at least one alcohol selected from the group consisting of monohydric alkyl alcohols and glycol ethers with silicon dioxide under anhydrous and alkaline conditions, and separating the alkyl orthosilicate from the reactants.

2. A method of preparing aliphatic orthosilicates, which method comprises heating under autogenous pressure and alkaline conditions, silica and at least one alcohol selected from the group consisting of monohydric alkyl alcohols and glycol ethers, continuously removing the water formed during said heating, and separating the aliphatic orthosilicate from the reactants.

3. A method of preparing aliphatic orthosilicates, which method comprises heating under autogenous pressure and alkaline conditions, a mixture consisting of silica, at least one reactant selected from the group consisting of monohydric alkyl alcohols and glycol ethers and a hydrocarbon solvent, continuously removing the water formed during said heating by forming an azeotropic mixture of water with said hydrocarbon solvent, and separating the aliphatic orthosilicate from the reactants.

4. A method of preparing aliphatic orthosilicates, which comprises heating silica and an excess of organic reactants selected from the group consisting of the monohydric alkyl alcohols and glycol ethers with between 1 and 40 mole percent (based on the amount of catalyst plus silica) of at least one alkaline catalyst selected from the group which consists of alkali metal hydroxides, alkali metal silanolates and alkali metal alkoxides, said heating being carried out at a temperature of between 100° C. to 200° C. under autogenous pressure; continuously removing the water formed during said heating, and separating the aliphatic orthosilicate from the reactants.

5. A method of preparing butyl orthosilicate, which method comprises heating butyl alcohol and silica with cesium hydroxide, continuously removing the water formed during said heating, and separating n-butyl orthosilicate from the reactants.

6. A method of preparing 2-butoxyethyl orthosilicate, which method comprises heating at a temperature of about 150° C., a mixture consisting of 2-butoxyethyl alcohol, xylene, silica and potassium hydroxide, continuously removing the water formed during said heating, and separating the 2-butoxyethyl orthosilicate from the reactants.

7. A method of preparing ethyl orthosilicate, which method comprises heating under autogenous pressure and alkaline conditions, a mixture of ethyl alcohol and silica, removing continuously the water during said heating and separating ethyl orthosilicate from the reaction mass.

8. A method of preparing ethyl orthosilicate, which method comprises heating under autogenous pressure a mixture of ethyl alcohol, an inert solvent, silica and at least one basic catalyst selected from the group consisting of the alkali metal hydroxides, alkali metal silanolates, and the alkali metal alkoxides, continuously removing the water formed during said heating and removing ethyl orthosilicate from the reactants.

References Cited in the file of this patent

UNITED STATES PATENTS

| 2,657,149 | Iler | Oct. 27, 1953 |
| 2,746,982 | Hyde | May 22, 1956 |

OTHER REFERENCES

Kautsky et al.: "Zeitung für Naturforschung," vol. 5b (1950), p. 443.

Daubach: ibid., vol. 8b (1953), pp. 58–60.